United States Patent [19]
Blake et al.

[11] 3,829,539
[45] Aug. 13, 1974

[54] NOVEL PROCESS FOR PREPARATION OF SILVER CHLORIDE POWDER

[75] Inventors: Ivan C. Blake, Westerly, R.I.; Ronald Cercone, Pawcatuck, Conn.

[73] Assignee: Yardney International Corp., Pawcatuck, Conn.

[22] Filed: Dec. 7, 1972

[21] Appl. No.: 312,958

[52] U.S. Cl.................... 264/13, 264/118, 264/140, 423/491
[51] Int. Cl........................................... B22d 23/08
[58] Field of Search ................ 423/491, 46; 23/305; 264/140, 118, 5, 13

[56] References Cited
UNITED STATES PATENTS

| | | | |
|---|---|---|---|
| 1,780,201 | 11/1930 | Martin | 264/140 |
| 2,070,134 | 2/1937 | Keyes | 264/140 |
| 2,257,878 | 10/1941 | Brennan | 264/5 |
| 3,147,073 | 9/1964 | Brown | 423/491 |

Primary Examiner—Robert F. White
Assistant Examiner—James B. Lowe
Attorney, Agent, or Firm—Donald E. Nist

[57] ABSTRACT

Improvements are provided in a process for preparing silver chloride which process includes heating metallic silver to above the melting point of silver chloride but below the melting point of silver and introducing chlorine gas above the heated solid silver while withdrawing molten silver chloride from contact with the heated silver. The improvements comprise heating the withdrawn silver chloride to at least about 1100° F. but below the decomposition point thereof and when passing the heated liquid silver chloride into water, recovering the resulting brittle silver chloride flakes and disintegrating the flakes to granular form.

5 Claims, No Drawings

NOVEL PROCESS FOR PREPARATION OF SILVER CHLORIDE POWDER

BACKGROUND

1. Field of the Invention

The present invention generally relates to the manufacture of silver chloride and, more particularly, to improvements in a process for preparing silver chloride from metallic silver by contact with chlorine gas at elevated temperature.

2. Prior Art

A conventional method of manufacturing silver chloride involves dissolving silver or silver-containing scrap material in nitric acid and then precipitating silver chloride from the resulting solution by contacting the solution with sodium chloride or hydrochloride acid or the like. The thus precipitated silver chloride is then washed and dried. Attempts to manufacture silver chloride by reaction of silver with chlorine gas at room temperature or somewhat elevated temperatures, such as 500°F. have been largely unsuccessful due to the lack of reaction or the slowness of the reaction.

However, a successful process has been provided which is more fully disclosed in U.S. Pat. No. 3,147,073, issued Sept. 1, 1964 to Kenneth N. Brown for "A Process for Preparing Molten Silver Chloride by the Controlled Reaction of Chlorine on Charge of Metallic Silver". Said patent has been assigned to assignee of the present application. Said patent calls for a process for preparing silver chloride which comprises introducing a charge of metallic silver into a reaction chamber, heating the reaction chamber to a temperature above the melting point of silver chloride but below the melting point of silver, continuously introducing chlorine gas at a location above the silver into the reaction chamber and continuously withdrawing the resulting molten silver chloride from the reaction chamber at a location below the solid silver in the chamber. With such a process silver chloride can be prepared economically. However, even though the silver chloride is relatively pure, it is recovered from the process in molten form and must be subjected to further treatment to place it into the desired finished size and shape, as by casting or the like.

Historically, substantial amounts of silver chloride in fine particulate form are utilized in industry for such purposes as, for example, photographic processes and the like. A substantial amount of time and effort and expense is normally incurred in converting silver chloride from solid or molten form into finely particulate solid silver chloride powder. Accordingly, it would be desirable to provide an improved procedure for treatment of the product of the described patented process in an economical manner so as to efficiently yield silver chloride granules of controlled particulate size as an end product.

SUMMARY OF THE INVENTION

The present invention satisfies the foregoing needs. The invention comprises improvements in a process for preparing silver chloride from solid silver by contacting elevated temperature with chlorine gas. The improvements of the process are substantially as set forth in the Abstract above. Such improvements permit pure silver chloride powder or granules to be easily provided from molten silver chloride formed as the end product of the process described and claimed in U.S. Pat. No. 3,147,073. The highly purified silver chloride in granular or powder form is useful for a variety of purposes including water purification and the like due to the bactericidal properties of the silver chloride. Such silver chloride is also useful in the photochemical industry, for example, in the preparation of photographic emulsions and the like. The improvements permit the patented process to operate on an even more economical basis than heretofore, do not involve complicated steps or machinery and can be carried out rapidly in a simple controlled manner. Other advantages and details of the improvements are as set forth in the following detailed description.

DETAILED DESCRIPTION

Silver chloride prepared in molten form in accordance with the process of U.S. Pat. No. 3,147,073 or similar process is treated in accordance with the present improvements to render it more readily disintegratable to fine granular or powder form. The process as set forth in U.S. Pat. No. 3,147,073 comprises heating pure silver bullion in a reaction zone to a temperature below its melting point but above the melting point of silver chloride and then continuously introducing chlorine gas above the level of the solid silver bullion in the reaction zone to react therewith to form molten silver chloride. The molten silver chloride is continuously withdrawn from the reaction zone below the solid silver so that it does not build up and block the reaction between the chlorine and silver.

In accordance with the present invention, the molten silver chloride which exits in the above-described process at a temprature substantially below 1100°F., usually at a temperature of about 900°F. is heated in a separate heating zone to at least about 1100°F. but below the decomposition point thereof and preferably, to about 1300°F. Higher temperatures are not necessary to achieve the desired results and may result in a waste of energy and time due to unnecessary heating. Lower temperatures are insufficient to achieve the desired results. After the molten silver chloride has been reheated to the indicated temperature it is then dripped or otherwise passed into a tank or vessel or reservoir containing water. Preferably, the water is cooled water, at least initially, and it is desired that the temperature difference between the molten silver chloride contacting the water and the water be at least about 1050°F. This temperature difference is necessary in order that the drops of molten silver chloride when solidifying in contact with the water do so sufficiently rapidly to cause them to be very brittle. The procedure of the invention forms brittle flakes of the silver chloride which may vary in size but may be, for example, up to about one-half or so along the major axis thereof and irregularly thin.

Should the temperature differential be less than that indicated as a minimum and/or should the temperature of the silver chloride on contact with the water be less than about 1100°F., insufficient instantaneous crystallization of the silver chloride occurs upon contact with the water regardless of the water's temperature. The net result is that the solidified globs of silver chloride cannot be readily disintegrated in a hammer mill or other conventional disintegrating device to fine powder or granular form without considerable difficulty and with considerable energy expenditure. It should be noted that the temperature differential and minimum temperature specified are essential to provide a desired readily granulatable product in an economical manner.

After the brittle flakes of silver chloride are formed in accordance with the improvement of the present invention, the flakes are then disintegrated in a hammer mill or other similar disintegrating device. It is preferred that the disintegration be carried out while the flakes are in dry form. Accordingly, the flakes may be removed from the water in which the flakes were formed, dried by conventional means such as heating, air blowing and/or the like and then passed to the disintegrating means for reduction to the desired particle size. A typical product has been produced which has a silver chloride content of 99.5+% and which can be readily milled to an average particle size such that 100 percent of the particles readily pass through a 60 mesh screen. The brittleness of the flakes assures that the milling operation is very readily carried out. Further aspects of the present invention will be apparent from the following specific Examples.

EXAMPLE I

A silver ingot weighing 100 pounds is placed in a closed reaction chamber fitted with external heating means, a gas inlet and outlet above the silver and a bottom liquid drainage outlet. The reaction chamber is heated to a temperature of about 1300°F. whereupon chlorine gas slightly above atmospheric temperature is introduced into the reaction chamber through the gas inlet, circulates over the top surface of the silver and exits the chamber through the gas outlet. The amount of chlorine gas is regulated to be in excess of that utilized in the reaction with the silver. The reaction is carried out for a period of about 100 minutes during which time molten silver chloride is formed on the top surface of the silver, drains from the solid silver, collects in the bottom of the chamber and is removed from the bottom liquid outlet.

The molten silver chloride at this point has a temperature of approximately 900°F. and is caused to flow to a separate heating zone in the form of a furnace and is heated therein to a temperature of about 1200°F. and at about that temperature is dripped from the furnace into water in a tank, the water having an average temperature of about 50°F. The water greatly exceeds the silver chloride in volume and is maintained within the temperature range of about 40°F. to about 60°F. by inflow of fresh cooled water. Brittle flakes of silver chloride are recovered from the bottom of the tank of water, dried by heating and air blowing and then passed into a hammer mill and therein granulated to about 60 mesh screen size. The energy computed to be utilized in granulating this silver chloride is less than about 10 percent that required to granulate silver chloride prepared by the same process except for first casting the silver chloride into molds solidifying and then breaking into small pieces and hammer milling. Accordingly, the present process and its improvements represent a substantial advance in the art.

EXAMPLE II

The process and the improvements specified in Example I above are carried out except that the procedure is continuous. Thus, there is a continuous removal of molten silver chloride from the reaction chamber, continuous passage of that molten silver chloride to a heating zone, continuous removal of molten silver chloride from the heating zone at about 1200°F. and continuous flowing of the thus-heated molten silver chloride in droplet form into the vat of water. Removal of formed flakes of silver chloride therefrom for hammer milling disintegration is carried out periodically. The same improved results are obtained as are specified for Example I.

Parallel runs are carried out in accordance with the process and improvements set forth in Example I, but substituting reheating temperatures of 1100°F., 1300°F. and no reheating but merely the exit temperature of 900°F. Results indicate that the silver chloride flakes produced utilizing a reheat temperature of 1100°F. and 1300°F. are equivalent in properties, including easy granulation, to the product of Example I. However, the flakes prepared by passing molten silver chloride heated to 1000°F. into water are not as brittle as those above-described. The flakes obtained by passing molten silver chloride at 900°F. into the water are even less brittle and very difficult to hammer mill to fine particulate form, requiring an expenditure of milling power and energy about 300 percent more than the 1100°F. to 1300°F. silver chloride products.

The above Examples clearly illustrate the improved results obtained through the use of the present improvements in the indicated process for preparing silver chloride. The improvements are easily and simply carried out and result in a decrease in energy expenditure and cost of manufacture of particulate silver chloride of high purity. Other advantages are as set forth in the foregoing.

Various modifications, changes, alterations and additions can be made to the present improved process, its improvements and the steps and parameters thereof. All such changes, modifications, alterations and additions as are within the scope of the appended claims form part of the present invention.

What is claimed is:

1. In a process for preparing silver chloride comprising heating metallic silver to above the melting point of silver chloride but below the melting point of said silver in a reaction zone, introducting chlorine gas above said heated silver, withdrawing resulting molten silver chloride from said reaction zone below said heated silver and, therefore, recovering solid silver chloride, the improvement which comprises effecting said recovery by heating said withdrawn silver chloride to at least about 1100° F. but below the decomposition point thereof and then passing said heated silver chloride in finely dispersed liquid form into water at a temperature of at least about 1050°F higher than said water, separating the resulting brittle silver chloride flakes from said water and disintegrating said flakes to granular form.

2. The improvement of claim 1 wherein said heating of said withdrawn silver chloride is carried out to a temperature of between about 1100°F. and about 1300°F.

3. The improvement of claim 2 wherein said water is at a temperature of about 40°–60°F. when said heated silver chloride initially contacts the same by being dripped thereinto.

4. The improvement of claim 1 wherein said silver is essentially pure silver bullion, wherein said chlorine gas is essentially pure, and wherein silver chloride of high purity is provided.

5. The improvement of claim 2 wherein said withdrawn silver chloride is passed to a separate reaction zone and heated therein within said range, wherein said silver chloride is dripped into said water and wherein after said dripping, said brittle silver chloride flakes are separated from said water and dried before said disintegrating.

* * * * *